US010051499B1

(12) United States Patent
Dron et al.

(10) Patent No.: US 10,051,499 B1
(45) Date of Patent: Aug. 14, 2018

(54) INDIVIDUAL RADIO FREQUENCY CONFIGURATION FOR USER DEVICES

(71) Applicant: Amazon Technologies, Inc., Seattle, WA (US)

(72) Inventors: Anuj Dron, San Jose, CA (US); Rohit Sammeta, Mountain View, CA (US); Adrian Napoles, Cupertino, CA (US); Ulf Jan Ove Mattsson, Saratoga, CA (US); Chun Kit Lai, Cupertino, CA (US); Daejoung Kim, Sunnyvale, CA (US); Namhoon Kim, San Jose, CA (US); Eswarappa Channabasappa, Sunnyvale, CA (US); Peruvemba Ranganathan Sai Ananthanarayanan, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 179 days.

(21) Appl. No.: 14/561,065

(22) Filed: Dec. 4, 2014

(51) Int. Cl.
*H04W 28/02* (2009.01)
*H04W 24/08* (2009.01)
*H04W 36/30* (2009.01)

(52) U.S. Cl.
CPC ........... *H04W 24/08* (2013.01); *H04W 36/30* (2013.01)

(58) Field of Classification Search
CPC .. H04W 64/00; H04W 12/12; H04L 63/1416; H04L 63/1441
See application file for complete search history.

(56) References Cited

U.S. PATENT DOCUMENTS

| 9,606,721 | B2 * | 3/2017 | Park | G06F 1/3246 |
| 2011/0153737 | A1 * | 6/2011 | Chu | H04L 67/104 709/204 |
| 2013/0121145 | A1 * | 5/2013 | Draznin | H04L 12/5692 370/230 |
| 2014/0366152 | A1 * | 12/2014 | Toubiana | H04L 67/02 726/26 |
| 2015/0085725 | A1 * | 3/2015 | Estevez | H04W 52/0206 370/311 |

* cited by examiner

*Primary Examiner* — Jamal Javaid
(74) *Attorney, Agent, or Firm* — Eversheds Sutherland (US) LLP

(57) ABSTRACT

Systems, devices, methods, computer-readable media, techniques, and methodologies are disclosed for optimizing radio frequency configuration of a user device for better power management and faster time to first fix. The radio frequency configuration of user devices may be optimized based on user input analysis, machine learning, or crowd sourcing methodologies.

20 Claims, 6 Drawing Sheets

INDIVIDUAL RADIO FREQUENCY CONFIGURATION FOR USER DEVICES

BACKGROUND

User devices are capable of connecting to different types of wireless communications or radio frequencies (RF). For example, smartphones, tablets, laptops, and other user devices may include components that enable identification and communication with cellular networks, wireless networks, or the like. However, identifying and communicating with wireless networks and configuring the user devices to enable communication with the identified wireless network require power consumption and loss of time. Power consumption and loss of time during initialization or the process of identifying and joining an available network may be measured using different methods. For example, loss of time associated with a user device identifying and communicating with a wireless network may be quantified using the time to first fix (TTFF). TTFF is a measure of time required for a Geographic Positioning System (GPS) receiver to acquire satellite signals and navigations data, and calculate a position solution. Power consumption may be monitored by comparing power levels before and after establishing a connection with a network.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily, the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
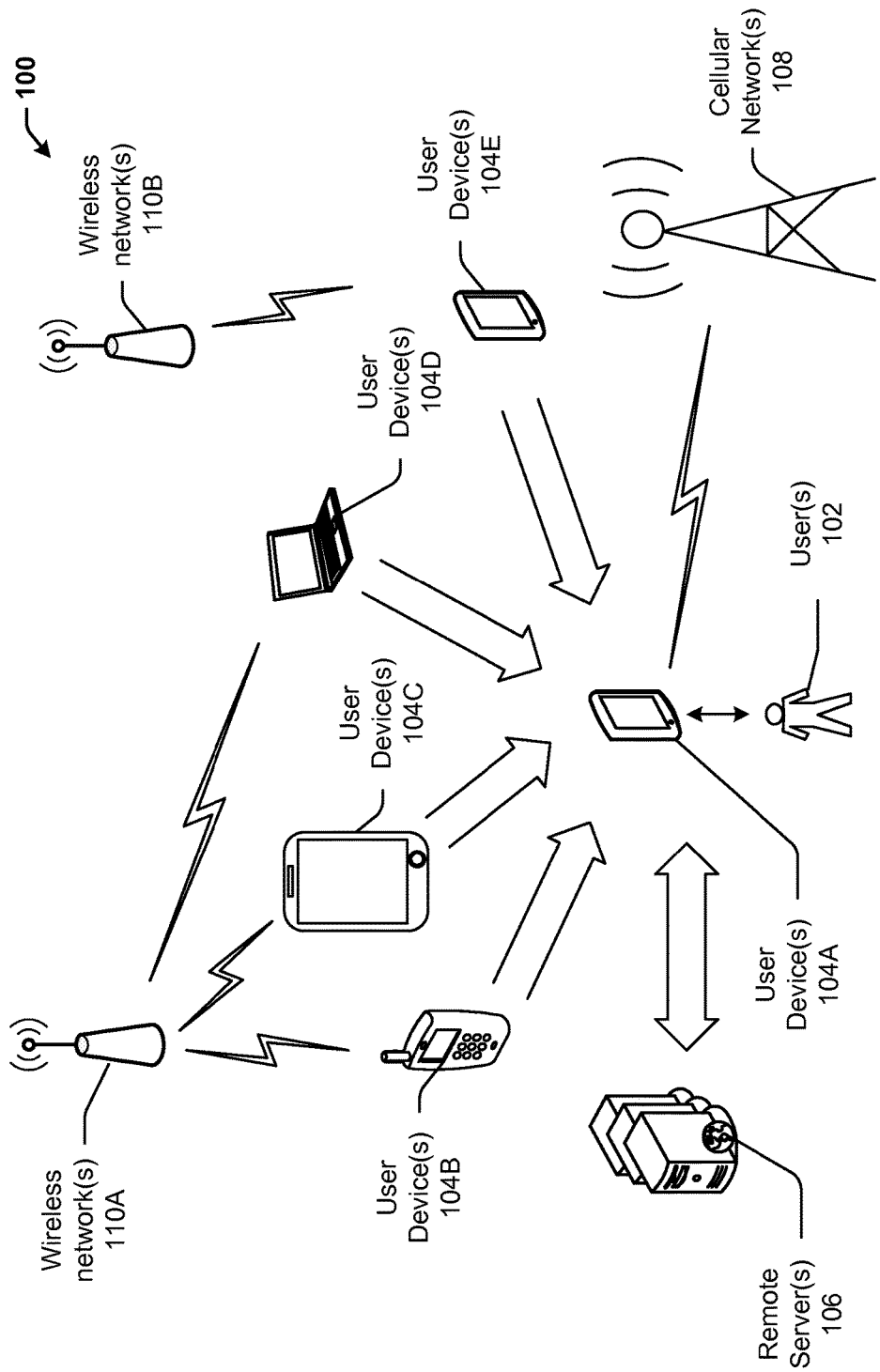
FIG. 1 is a schematic system and data flow diagram illustrating the optimization of radio frequency configuration for user devices in accordance with one or more example embodiments of the disclosure.

This disclosure relates to, among other things, systems, devices, methods, computer-readable media, techniques, and methodologies for optimizing radio frequency (RF) configurations for user devices. Optimizing RF configurations on user devices may lead to more efficient power management, which may extend the battery life of a user device, and improved efficiency in establishing connectivity via RF signals, which may decrease the amount of time spent by a user device scanning for an available network. In some embodiments, the decrease in the amount of time may be quantified by measuring the Time to First Fix (TTFF) for a user device. TTFF is a measure of the time required for a GPS receiver of a user device to acquire satellite signals and navigation data, and calculate a position solution.

In some embodiments, RF configurations of user devices may be stored as states. The states may include various parameters, such as a network identifier parameter (e.g., the value of the network identifier parameter may be a service set identifier (SSID), a MAC address, etc.), any authentication credential parameter necessary to establish a connection with the network (e.g., authentication credential value, such as a network key), user preferences, power control, channel selection, Radio Access Technology (RATs) parameters, or the like. Each RAT may be associated with an underlying physical connection method for a radio based communication network. Many user devices (e.g., cell phones, tablets, smart watches, etc.) may support multiple RATs in a single device. Examples of RATs may include Bluetooth, WiFi, 3G, 4G, and/or LTE. Different user device states may be stored in any type of data structure, such as a table. The data structure may be stored a local data storage of the user device or in a remote directory on a remote server or data store. Each RF configuration may include one or more different methods of RF configuration optimization, and may utilize the user device state data to improve power management of user devices and decrease time spent configuring devices to optimally connect to available wireless networks.

The optimizations for RF configurations for user devices may be categorized into three groups: user input based optimization, machine learning optimization, and crowdsourcing optimization. User input based optimization may involve a user device collecting data from multiple sources, such as one or more user applications (e.g., collecting user application data). The user device may collect data that originated from a user, such as calendar events, directions, reminders, and the like. The user device may collect user application data from different user applications and may analyze the data to identify one or more parameters associated with a current or predicted future state of the device. The user device may then determine whether a current or predicted future state matches an existing state. If an existing state is identified, then the user device may retrieve the parameters of the existing state and utilize the RF configurations associated with the existing state to efficiently establish a connection with a wireless network, such as a WiFi network or a specific cellular tower. In some examples, a user may have a calendar event specifying that a meeting is scheduled in a conference room. The user device may obtain the calendar event and identify the date and time of the meeting and its location. Prior to the meeting time, the user device may determine whether the conference room is known (e.g., exists in state information associated with the user device). Prior to the meeting, if the conference room is known, the user device may modify the RF configurations of the user device to establish a connection via a known, available network associated with the conference room. If the conference room is not known, temporary state data may be stored and state data for the conference room and user device may be generated and stored in a remote directory. The next time a meeting is scheduled in the conference room, the user device may be able to retrieve state data associated with the conference room based on the data obtained from a calendar event and the user device may modify RF configurations based on the retrieved state data.

In another example, a user may be travelling from Sunnyvale to the San Francisco airport. The user device may obtain data from a maps application the user is operating to display directions from Sunnyvale to the San Francisco airport. Based on the data obtained from the maps application, the user device may identify the geographic location the user device will likely be traveling at any particular time, and may retrieve state information associated with the geographic area associated with the user device's geographic location. The state information may include information such as the optimal RF networks (e.g., bands) available on the GPS route and may proactively modify the RF configurations of the user device to utilize identified RF bands to ensure optimal connectivity during the drive between Sunnyvale and the San Francisco airport.

In some embodiments, machine learning based optimizations may include a user device collecting data, such as user application data and other data generated through the operation of the user device. The data may be continuously collected and data exceeding a pre-determined threshold may be expunged. In some embodiments, data may be collected at periodic intervals, either set by a user or at time of manufacture (e.g., every 30 seconds, every minute, every hour, etc.). For example, a user device may collect data but may expunge data that is older than three months old. The threshold may be specified by a user. The user device may collect the data and use machine learning algorithms to identify and/or generate one or more behavioral patterns based on the collected data. In some embodiments, a behavioral pattern may include a timeline of events. In some embodiments, the events of the behavioral pattern may be categorized. For example, a behavioral pattern may indicate that during early morning hours, a user typically communicates with other individuals (e.g., text messaging, phone calls, video conferencing, etc.) while traveling an identified route (e.g., driving, riding a train, riding a bus, etc.), a weekly recurring meeting in a conference room, a daily visit to a coffee shop with multiple wireless networks available for users, or some other type of recurring behavior of a user. The identified patterns and categories may be further analyzed to identify one or more parameters associated with a current state or predicted future state of the user device. The one or more parameters may be used to predict future RF configurations for the user device. Example parameters may include power control, channel selection, RATs selection, dielectric and loss tangent parameters, or the like. The one or more parameters may be used to identify an existing state associated with the user device. If the user device identifies an existing state, the user device may retrieve the one or more parameters associated with the existing state and modify the RF configurations of the user device to optimize connectivity of the user device. For example, a behavioral pattern of a user may indicate that the user drives down Main Street after 8:00 AM during which time he makes phone calls. The phone calls may be categorized as communications. The behavioral data and categories may be analyzed and nearby cell towers may be identified. The user device may modify the RF configurations to automatically connect to one of the identified cell towers prior to the user driving down Main Street so that the user device is available to make phone calls, as identified during the analysis of the collected data.

In some embodiments, crowdsourcing optimization may involve a user device communicating with one or more adjacent or neighboring user devices. The user device may receive data from neighboring user devices and configure the RF configurations based on the received data. The data received from neighboring user devices may include GPS information, such as ephemeris and almanac information, that may be shared between peers in close proximity to the user device. Sharing such data would decrease the need for each user device to individually obtain such data, which would consume additional time and power.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. For example, while example embodiments may be described in connection with obtaining iris template patterns having increased clarity, sharpness, and/or detail, embodiments of the disclosure are applicable to other contexts as well including, but limited to, obtaining images having increased clarity, sharpness, and/or detail as part of a remote deposit capture process, for example. The above-described embodiments and additional and/or alternative embodiments of the disclosure will be described in detail hereinafter through reference to the accompanying drawings.

Illustrative Processes

FIG. 1 is a schematic system and data flow diagram 100 illustrating the optimization of radio frequency configuration for user devices in accordance with one or more example embodiments of the disclosure.

In an example embodiment, a user 102 may operate a user device 104A. A user device 104A may be any type of device capable of transmitting and receiving radio frequency (RF) signals, such as communications with a cellular network and/or WiFi network. The user device 104A may include, but is not limited to, a smartphone, cell phone, tablet, smart watch, wearable computer, laptop, or the like. The user device 104A may be of any type of wireless device, such as those described in conjunction with FIG. 6, described in more detail below.

The user 102 may enter data into various user applications executing on the user device 104A. For example, a user 102 may create and save a calendar event that specifies a work meeting in a conference room at a particular date and time. In some embodiments, one or more modules (which will be described in more detail later in this disclosure in reference to FIG. 6) may be executed by one or more processors of the user device 104A to obtain the data entered by the user 102 from the user applications. The obtained data may be analyzed or otherwise processed and may be used to identify a state of the user device. A state of the user device 104A may reflect an RF configuration for the user device 104A for a specific scenario (e.g., RF configuration for a particular location, such as a conference room). A state of the user device 104A may be associated with one or more parameters (e.g., power control of the user device 104A, channel selection for an identified wireless network, radio access technology (RATs) parameters, and the like). In some embodiments, the parameters associated with a state may be associated with values based at least in part on data obtained from the user applications of the user device 104A. In some embodiments, the user device 104A may analyze or otherwise process the data obtained from the user applications. The user device 104A may then determine whether the processed data is associated with an existing state. The user device 104A may identifying an existing state based at least in part on the data and may retrieve one or more parameters associated with the existing state. The user device 104A may then modify the RF configurations of the user device 104A based at least in part on the information (e.g., parameters) retrieved in association with the existing state. If the user device 104A determines that a state does not exist based on the processed data, the user device 104A may generate state information (e.g., add a new entry in a table storing state information associated with the user device 104A) and may associate the parameters based on the processed data from the user device 104A. For example, the user device 104A may determine that wireless network is available in the conference room specified in the calendar event created by the user 102. The user device 104A may determine a state does not exist for the user device 104A using the wireless network available in the conference room. The user device 104A may generate state information using information associated with the wireless network. The next time the user 102 has a meeting in the conference room, then the user device 104A may retrieve the previously stored state information and establish a connection with the wireless network prior to a meeting in the conference room, which may be identified via another calendar event generated by the user 102.

In some embodiments, the state information of a user device 104A may be stored in a remote server 106. In some embodiments, the state information may be stored in a data structure, such as a table. The state information may be stored in a remote directory, which may be accessed by one or more user device(s) 104. A remote server 106 may be any type of computing device, such as a computer, laptop, server, desktop, tablet, or the like, capable of receiving, storing, managing, transmitting, generating, or otherwise processing data.

In some embodiments, the user device 104A may collect information associated with a user, such as location information of a user or calling habits. For example, a user may commute to work on weekdays using a specific route and during that time period may habitually initiate phone calls during the commute. In some embodiments, the user device 104A may collect such information and either process the collected information locally or may transmit the information to a remote server 106 for further processing. In some embodiments, the further processing, either performed on the user device 104A or a remote server 106, may utilize one or more machine learning algorithms to identify patterns associated with the user 102. In some embodiments, machine learning algorithms may be classified broadly based on the "learning" style of the algorithm or functionality of the algorithm. In some embodiments, examples of the different styles of "learning" may include supervised, unsupervised, semi-supervised, and reinforcement. Some examples of machine learning algorithms may include, but are not limited to Ordinary Least Squares, Logistic Regression, Stepwise Regression, Multivariate Adaptive Regression Splines (MARS), Locally Estimated Scatterplot Smoothing (LOESS), k-Nearest Neighbor (kNN), Learning Vector Quantization (LVQ), Self-Organizing Map (SOM), Ridge Regression, Least Absolute Shrinkage and Selection Operator (LASSO), Elastic Net Classification and Regression Tree (CART), Iterative Dichotomiser 3 (ID3), C4.5, Chi-squared Automatic Interaction Detection (CHAID), Decision Stump, Random Forest, and Gradient Boosting Machines (GBM).

For example, the machine learning algorithms may identify that the user 102 travels a specific route every weekday during a particular window of time (e.g., between 7:00 AM to 7:30 AM). Based on the identification of the specific route, the machine-learning algorithm may also identify one or more available cellular networks 108. Based on additional information processed by the machine learning algorithm (e.g., identification of available cell towers along the route, user preferences based on behavior, etc.), the user device 104A may be able to predict future RF configurations for the user device 104A to utilize as the user 102 commutes to work. In some embodiments, the RF configurations may be stored as state information and may be retrieved based on triggers identified by the machine learning algorithms (e.g., user 102 begins commute along the route and reaches a specific point in the route, where the user device 104A may retrieve state information and modify the RF configuration of the user device 104A prior to the user 102 initiating their phone calls during the commute). Any changes in the user behavior (e.g., deviations from usual route) may be collected and analyzed (e.g., using the machine learning algorithms) and may generate new state information which may be employed by the user device 104A based on identified triggers.

In some embodiments, RF configuration for a user device 104A may be based on crowdsourcing, where one or more adjacent or neighboring user device(s) 104B-104E (collectively 104) may transmit data (e.g., GPS ephemeris and almanac information, wireless network 110A, 110B parameters, etc.) to the user device 104A. In some embodiments, the user device(s) 104 may need to explicitly opt-in or otherwise agree to sharing data with other user device(s) 104. In some embodiments, the data may be anonymously received and transmitted by the user device(s) 104. For example, the user device 104A may receive data from adjacent or neighboring user device(s) 104B-104E and identify one or more available wireless network(s) 110A, 110B. User device(s) 104B, 104C, 104D may be connected to wireless network 110A User device 104E may be connected to wireless network 110B. Data received from the adjacent or neighboring user device(s) 104B-104E may be processed by user device 104A and user device 104A may determine to establish a connection with wireless network 110A based on its performance. In some embodiments, the user 102 may have specified preferences for selecting a wireless network 110 from available wireless networks. For example, a user 102 may specify to select a less congested wireless network (e.g., wireless network 110B) despite performance differences. For example, a total number of current mobile devices connected to and/or associated with wireless network 110A may be determined. A total number of current mobile devices connect to and/or associated with wireless network 110B may also be determined. Wireless network 110A may be determined to be less congested than wireless network 110B if the total number of current mobile devices connected to and/or associated with wireless network 110A is less than the total number of current mobile devices connected to and/or associated with wireless network 110B. In some embodiments, the determination may be made by a base station in communication with the respective user devices 104. In some embodiments, the user device 104A may then determine to establish a connection with wireless network 110B based on information received from user device 104E and user preferences of user 102. In some embodiments, the user preferences may be stored locally on user device 104A or in a remote directory associated with the user device 104A, such as in a remote server 106. The user device 104A may utilize the user preferences, along with any information received from adjacent or neighboring user devices 104B-104E when selecting a wireless network 110A or 110B to utilize. Upon selection of a network, the user device 104A may modify one or more RF configurations based on the information received from the adjacent or neighboring user devices 104B-104E, as well as previously stored user preferences. For example, a user preference may indicate a preference to connect to a secure wireless network or a network with less traffic or congestion, regardless of the signal strength associated with the wireless network.

Figure 2A:
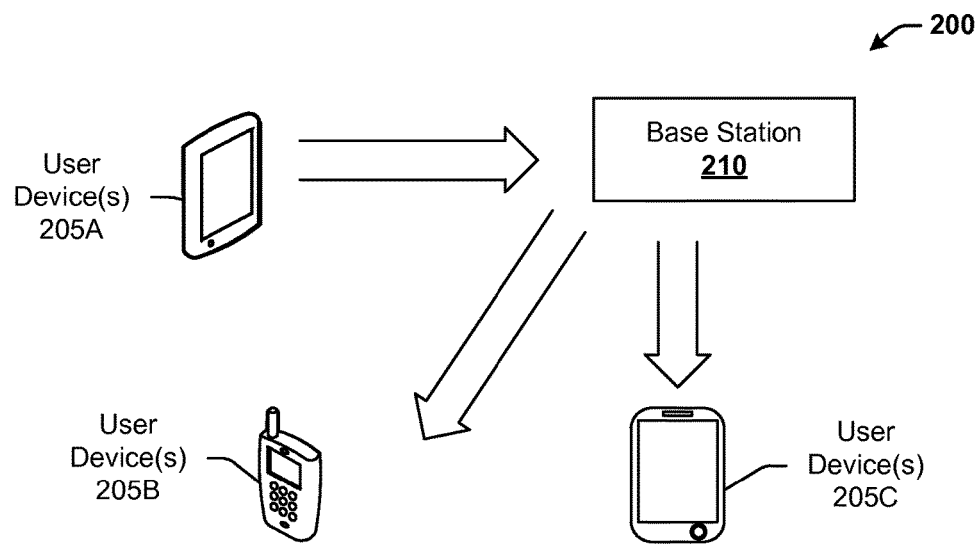
FIGS. 2A-2B are schematic system and data flow diagrams illustrating the optimization of radio frequency configuration for user devices in accordance with one or more example embodiments of the disclosure.

FIG. 2A is schematic system and data flow diagram 200 illustrating the optimization of radio frequency configuration for user devices in accordance with one or more example embodiments of the disclosure. FIG. 2A depicts user devices 205A-205C connected to a base station 210. In some embodiments, user device 205A may be connected to GPS and may have ephemeris and almanac data stored in local and/or remote data storage. GPS signals can include ranging signals, used to measure the distance to the satellite, and navigation messages. The navigation messages may include ephemeris data, used to calculate the position of each satellite in orbit (e.g., via trilateration), and information about the time and status of the entire satellite constellation, sometimes referred to as almanac data. User devices 205B and 205C may not be connected to a GPS device. User device 205A may transmit data (e.g., ephemeris data, almanac data, etc.) to a base station 210. The base station 210 may send the information received from user device 205A to other user devices (e.g., 205B, 205C). In some embodiments, the base station 210 may determine to transmit information received from user device 205A based on different types of data. For example, the base station 210 may determine to transmit the information received from user device 205A to user device(s) 205B or 205C based at least in part on location of the other user devices, whether the user device(s) have selected to receive data from other user device(s), type of connection, user preferences, or the like. User device(s) 205B, 205C may receive the data originating from user device 205A via the base station 210 and use the information to optimize RF configuration settings to connect to GPS. In some embodiments, user device(s) 205B, 205C may update their respective RF configurations and transmit data back to the base station 210. The base station 210 may receive the data from the user devices 205B, 205C and may transmit the data to another user device that later connects to the base station 210. In some embodiments, the base station 210 may receive data from different user device(s) 205 and may generate and/or monitor network traffic associated with different networks 108, 110. In some embodiments, the base station 210 may provide network traffic data to requesting user device(s) 205.

Figure 2B:
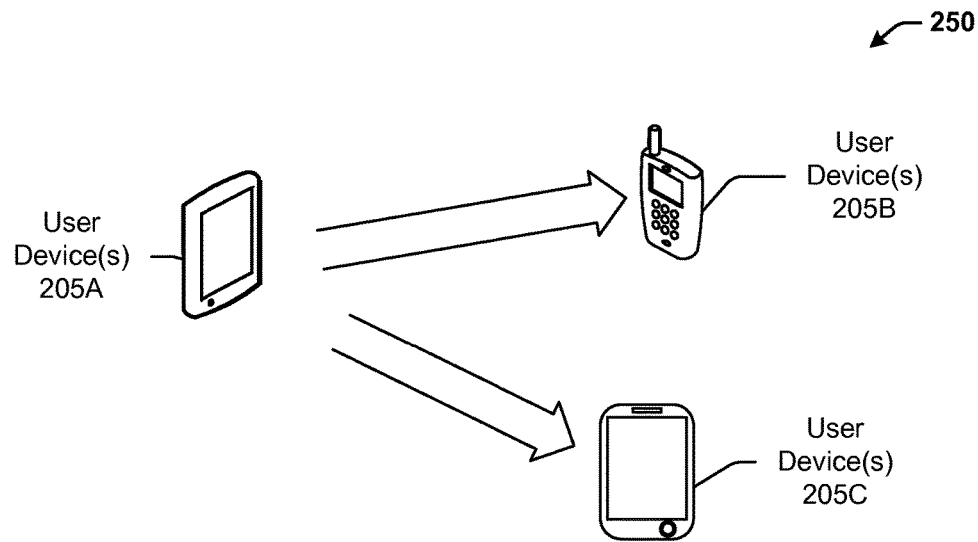

FIG. 2B is schematic system and data flow diagram 250 illustrating the optimization of radio frequency configuration for user devices in accordance with one or more example embodiments of the disclosure. FIG. 2B depicts user devices 205A-205C connected to each other. In some embodiments, the user devices 205A-205C may be connected via peer-to-peer protocols. In some embodiments, the user devices 205A-205C may be connected to a common WiFi network. In some embodiments, a user device 205A may determine the proximity of other user device(s) 205B, 205C using different techniques (e.g., fine timing measurement techniques, etc.) to determine a distance between the user device 205A and other device(s) 205B, 205C. In some embodiments, the user device 205A may then identify the closest user device (e.g., the user device with the shortest measure distance between it and user device 205A) and obtain data from that user device, such as RF configuration data, GPS ephemeris and almanac data. In some embodiments, the user device 205A may update its RF configurations based on the obtained data and may initiate connection with a wireless network or GPS activity based on the updated RF configurations. For example, user device 205A may not currently be connected to a wireless network, user device 205B may be connected to wireless network 110A, and user device 205C may be connected to wireless network 110B. Each user device 205A, 205B, 205C may have a respective radio frequency (RF) configuration that may include a service set identifier (SSID) parameter and a network key parameter. An SSID may be an identifier associated with a basic service set (BSS) or an extended service set (ESS) wireless network. A network key may be a password to connect to a wireless network.

User device 205A, currently not associated with a wireless network, may generate current or temporary state data. The state data may include the same parameters as the RF configuration, such as the SSID parameter and the network key parameter. As user device 205A is not associated with a wireless network, the SSID parameter and the network key parameter of the current state data may be set to null. In some embodiments, user device 205A may receive data from user device(s) 205B, 205C. In some embodiments, the user device 205A may request information from user devices 205B and 205C. In some embodiments, the user device 205A may receive information from user devices 205B and 205C in response to being identified by user devices 205B and 205C. For example, user device(s) 205 may identify other user device(s) 205 within communicable range of each other depending on the range of components of the user device 205 (e.g., Bluetooth, NFC, etc.) or by utilizing fine timing measurement techniques to identify a distance of a user device 205 from each other.

In some embodiments, user devices 205B and 205C may transmit to user device 205A respective data sets. For example, the data sets may include an SSID value for a network to which the user device 205 is connected, a network key value for the network to which the user device is connected, and a received signal strength indication (RSSI) value associated with the network to which the user device 205 is connected. The user device 205A may receive the respective data sets from the other user device(s) (e.g., 205B, 205C) and may analyze the received information. For example, in some embodiments, the user device 205A may compare RSSI values of the respective networks to determine which has a higher value. The user device 205A may determine, for example, that network 110A has a higher RSSI value and may thus update the current state information using the data received from user device 205B and establish a connection with wireless network 110A. In some embodiments, the RF configuration of the user device 205A may be updated using the current state data.

In some embodiments, user device 205A may then identify another user device (not pictured) in the vicinity and may measure an RSSI value of wireless network 110A using the updated RF configuration data of user device 205A or the current state data.

In some embodiments, the user device 205A may select a wireless network based on other factors, such as user preferences. User preferences may include a preference to use a secure wireless network over an unsecure wireless network, in which case an authentication credential value (e.g., network key) may be obtained, if not already received, from the respective user device. In some embodiments, a user preference may specify to select a less congested network. In some embodiments, congestion or traffic of a network 110 may be determined by identifying a number of users associated with a wireless network and compare the identified number of users to the identified number of users associated with other wireless networks. In some embodiments, traffic or congestion of a network may be determined by comparing a current number of users to a pre-determined or pre-specified threshold indicative of a maximum number of permissible users associated or connected to a network. For example, if there are currently 15 users associated with wireless network 110A and 20 users with wireless network 110B, if traffic or congestion is calculated using a comparison of the current users of the respective networks, the user device 205A may select wireless network 110A. If, however, congestion or traffic is determined by comparing the current number of users associated with a network with a threshold, and the threshold is 10 users, then the user device 205A may select to not connect to either network.

In some embodiments, user device 205A may determine to select the wireless network associated with a closest user device. For example, user device 205A may determine (e.g., fine timing measurement techniques, etc.) that user device 205B is approximately 10 feet away whereas user device 205C is approximately 100 feet away. By comparing the 10 feet distance with the 100 feet distance, user device 205A may determine to select the wireless network associated with user device 205B because the distance between 205A and 205B is less than the distance between 205A and 205C.

In some embodiments, user preferences may be specified to select a wireless network with the most recent connection. For example, user device 205A may determine, based on the information received from user device(s) 205B, 205C that user device 205B connected to wireless network 110A 3 hours ago, whereas user device 205C connected to wireless network 110B less than 10 minutes ago. Based on the differences in time of connection, user device 205A may select to connect with wireless network 110B as it may be the more recent connection.

As in FIG. 2A, in some embodiments, user device 205A may be connected to GPS and may have ephemeris and almanac data. User devices 205B and 205C may not be connected to a GPS device. User device 205A may transmit data (e.g., ephemeris data, almanac data, etc.) to other user devices (e.g., 205B, 205C). In some embodiments, user device 205A may determine to transmit information based on different types of data. For example, user device 205A may determine to transmit the information to user device(s) 205B or 205C based at least in part on location of the other user devices, whether the user device(s) have selected to receive data from other user device(s), type of connection, user preferences, or the like. User device(s) 205B, 205C may receive the data originating from user device 205A and use the information to optimize RF configuration settings to connect to GPS. In some embodiments, user device(s) 205B, 205C may update their respective RF configurations and transmit data to other use device(s) (not depicted).

Figure 3:
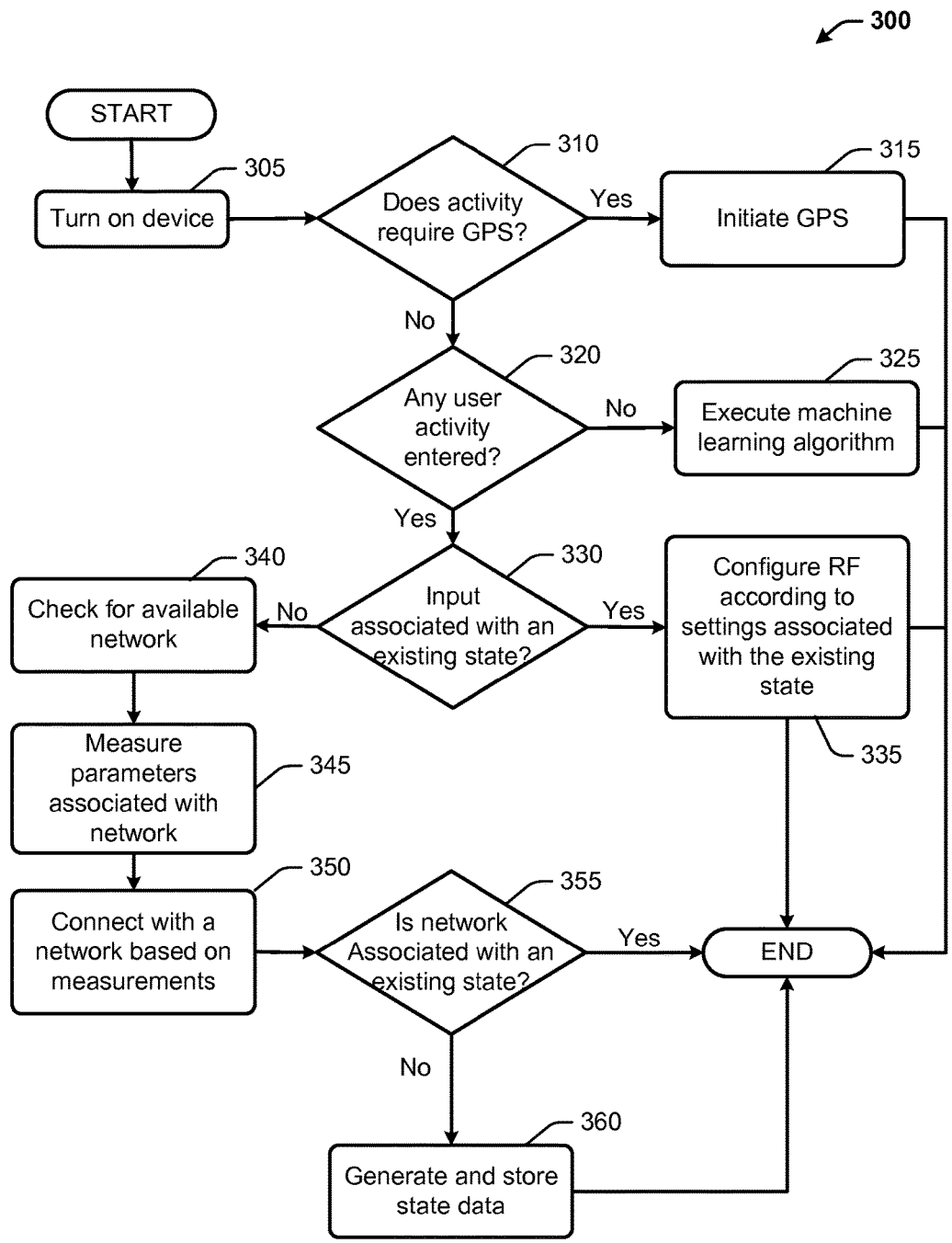
FIG. 3 is a process flow diagram of an illustrative method for optimizing the radio frequency configuration for user devices based on machine learning and/or user activity in accordance with one or more example embodiments of the disclosure.

FIG. 3 is a process flow diagram of an illustrative method 300 for optimizing the radio frequency configuration for user devices based on machine learning and/or user activity in accordance with one or more example embodiments of the disclosure. At block 305, a user device 104 may be turned on. At block 310, computer-executable instructions, code, or the like of a user device configuration module(s) 622 (which will be described in more detail later in this disclosure in reference to FIG. 6) may be executed by one or more processors to determine whether a requested activity (e.g., user-initiated, initialization process, etc.) requires GPS data. If at block 310, the user device configuration module 622 determines the requested activity requires GPS data, then at block 315 the user device configuration module 622 may initiate GPS activity (e.g., initiating GPS time to first fix algorithms). The method 300 may then be terminated.

If at block 310 the user device configuration module 622 determines that the requested activity does not require GPS data, then at block 320, a determination may be made as to whether the user 102 has entered or otherwise initiated any activity. Examples of user activity may include creating calendar events in a calendar user application and entering data into the calendar event, requesting directions using a map application, or the like.

If the user device configuration module 622 determines at block 320 that no user activity has been entered, initiated, or that no user activity has been entered or modified since the last time the user device configuration module 622 checked, then at block 325, the user device configuration module 622 may initiate or execute one or more machine learning algorithms. The one or more machine learning algorithms may be applied to data collected by the user device 104, such as by a data collection module 618 (which will be described in more detail later in this disclosure in reference to FIG. 6). For example, the data collection module may collect data, such as user application data and other data generated through the operation of the user device 104. The user device 104 may collect the data and apply machine-learning algorithms to identify one or more behavioral patterns within the collected data. The identified patterns may be further analyzed to identify one or more parameters associated with a current state or predicted future state of the user device. The one or more parameters may be used to predict future RF configurations for the user device 104. Example parameters may include power control, channel selection, RATs selection, dielectric and loss tangent parameters, or the like. The one or more parameters may be used to identify an existing state (e.g., RF configurations) associated with the user device 104. If the user device 104 identifies an existing state, the user device 104 may retrieve the one or more parameters associated with the existing state and modify the RF configurations of the user device 104 to optimize connectivity of the user device 104.

If at block 320, the user device configuration module 622 determines that user activity has been entered (e.g., newly created and/or entered since the last determination), then the data entered by the user 102 (e.g., user activity data) may be processed and/or analyzed to identify any parameters that may be associated with a state of the user device 104. For example, the user activity may be a calendar event and the calendar event may be analyzed to identify a location of a meeting, such as conference room in a building. Then at block 330, the user device configuration module 622 may determine whether any of the values and/or parameters identified from the user input is associated with an existing state of the user device 104. For example, user device state information may include different RF configurations for different environments (e.g., different wireless network parameters available in different conference rooms). Such state information may be stored in a data structure, such as a table. The state information may be stored in a remote directory, such as on a remote server 106 or locally stored on the user device 104 in data storage. If the user device configuration module 622 determines that the processed user activity data is associated with an existing state, then at block 335, parameters associated with the existing state may be retrieved from the remote directory and the RF configurations of the user device 104 may be modified to reflect the settings associated with the existing state. For example, if the conference room specified in the calendar event is known to have an available network named "Conference Room D Network", then the RF configurations may be modified to automatically connect to the network and may include authentication credential values (e.g., network key) necessary to join the network.

If at block 330, the user device configuration module 622 determines that the processed user activity data is not associated with an existing state, then at block 340, the user device configuration module 622 may scan to identify available wireless networks and at block 345 may measure parameters associated with the available wireless networks (e.g., type of network, type of authentication credential values required, etc.). At block 350, the user device configuration module 622 may facilitate connection with an identified network based on the measured parameters.

At block 355, the user device configuration module 622 may determine whether the network the user device 104 connects to is associated with an existing state. If the user device configuration module 622 determines that the network is associated with an existing state and determines no existing state is associated with the network, then the method may end. If the user device configuration module 622 determines that the network is not associated with an existing state and determines no existing state is associated with the network, then at block 360, the user device configuration module 622 may generate state information associated with the network and user device 104 and associate the parameters using the measurements obtained at block 345 and may store the state information, such as in a remote directory as described herein.

Figure 4:
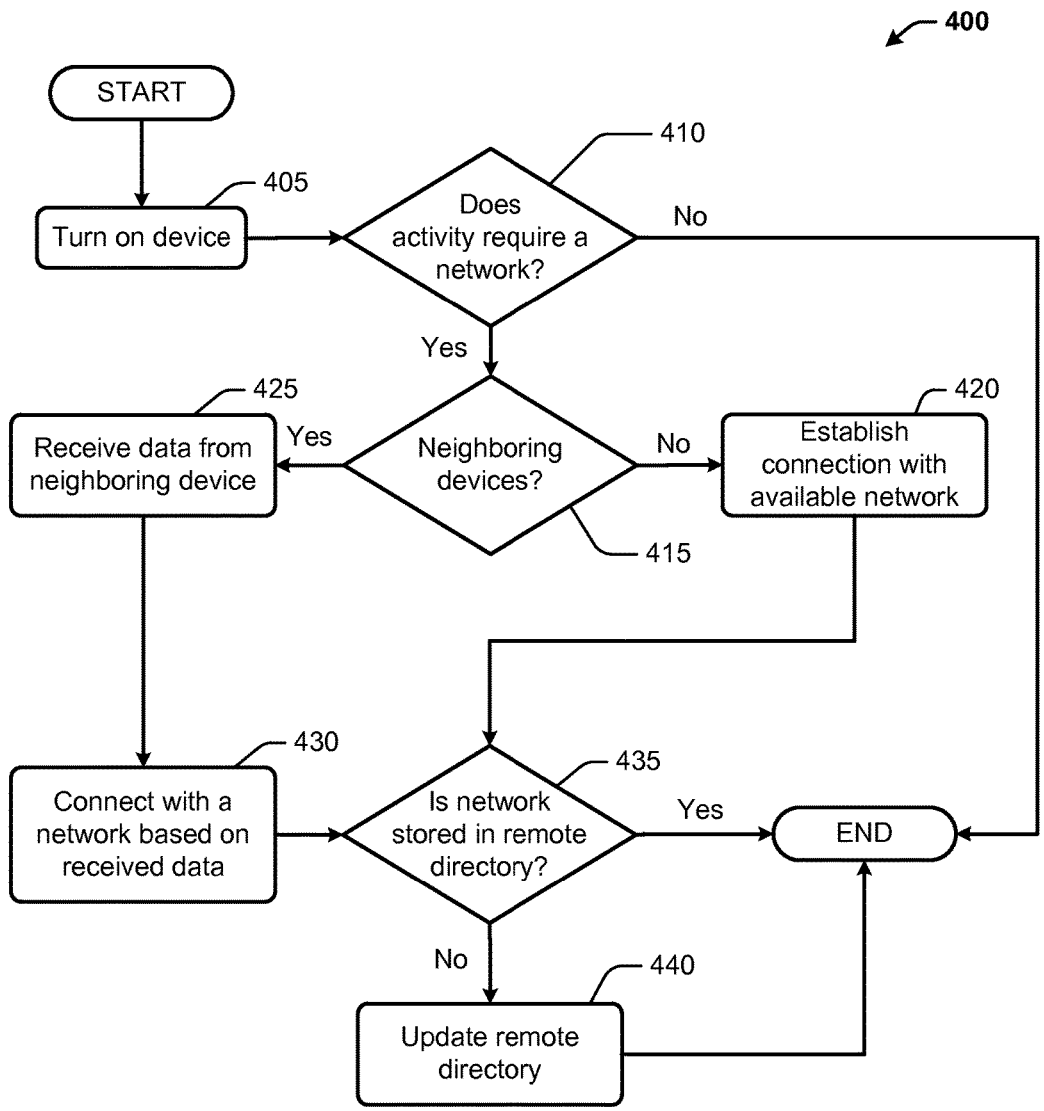
FIG. 4 is a process flow diagram of an illustrative method for optimizing the radio frequency configuration for user devices based on crowd sourcing in accordance with one or more example embodiments of the disclosure.

FIG. 4 is a process flow diagram of an illustrative method 400 for optimizing the radio frequency configuration for user devices based on crowdsourcing in accordance with one or more example embodiments of the disclosure. At block 405, a user device 104 may be turned on. At block 410, computer-executable instructions, code, or the like of a user device configuration module(s) 622 (which will be described in more detail later in this disclosure in reference to FIG. 6) may be executed by one or more processors to determine whether a requested activity (e.g., user-initiated, initialization process, etc.) requires a network. If the user device configuration module 622 determines that a requested activity does not require access to a network, then the method may end. If the user device configuration module 622 determines that a requested activity requires access to a network, then at block 415, the user device configuration module 622 may determine whether there are neighboring user devices.

At block 415, if the user device configuration module 622 determines that there are no neighboring user device(s) 104, then at block 420, the user device configuration module 622 may establish a connection with an available network. Establishing a connection with an available network may require obtaining credentials, such as passwords, to acquire access to the network, and characteristics of the network. The user device configuration module 622 may store the data as parameters associated with a temporary state of the user device 104. A state associated with a user device 104 may include one or more parameters associated with an identified network. The parameters may be stored in association with the state (e.g., the state may be associated with a state identification number). Values for the parameters may be stored in association with a state in a data structure, such as a table. The values may be associated based on data obtained by the data collection module 618 (which will be described in more detail later in this disclosure in reference to FIG. 6).

Then at block 435, the user device configuration module 622 may determine whether the network that the user device 104 connects to is stored in a remote directory. For example, state information associated with a user device 104 may be stored in a remote directory in the form of a table. The user device configuration module 622 may retrieve state data based on the temporary state of the user device 104 identified at block 420. The user device configuration module 622 may compare the temporary state data with the retrieved state data to determine whether the network described at block 420 is stored in the remote directory. If the user device configuration module 622 determines the network already exists in the remote directory, the method 400 may end. If the user device configuration module 622 determines the network does not exist in the remote directory, then at block 440, the user device configuration module 622 may update the remote directory (e.g., state data stored in the remote directory) using the temporary state data obtained at block 420. The method 400 may terminate upon completion of the update to the remote directory.

If at block 415, the user device configuration module 622 identifies one or more neighboring user device(s) in proximity to the user device 104 (e.g., via peer-to-peer protocol, on the same WiFi network, etc.), then at block 425, the user device configuration module 622 may receive data from the neighboring user device(s). In some embodiments, the user device configuration module 622 may request information from the neighboring user device(s). In some embodiments, the neighboring user device(s) may recognize the user device 104 and transmit data to the user device 104. The data received from the neighboring user device(s) may include RF configuration data, such as GPS data (e.g., ephemeral and/or almanac data) and/or wireless network data (e.g., preferred channels, available WiFi networks, etc.).

At block 430, the user device configuration module 622 may connect with a network based at least in part on RF configuration data received from one or more neighboring devices. For example, the RF configuration data received from the one or more neighboring devices may include a received signal strength indication (RSSI) value associated with the wireless networks the neighboring devices may be associated with. In some embodiments, the user device configuration module 662 may compare the RSSI values associated with the different neighboring devices and wireless networks and may select a neighboring device based on a greater RSSI value than the other neighboring devices. The user device configuration module 662 may then update the RF configuration data of the user device using the received RF configuration data received from the selected neighboring device. In some embodiments, the user device configuration module 622 may retrieve existing state information associated with the user device 104 based at least in part on the data received from neighboring devices.

At block 435, the user device configuration module 622 may determine whether a network is stored in a remote directory (e.g., state information associated with the user device). If the user device configuration module 622 determines the network information is already stored in an existing state (e.g., state information for the user device, which may be stored in a table stored in a remote directory), then the method 400 may end. If, at block 435, the user device configuration module 622 determines the network data is not currently stored in a remote directory, then at block 440, state information associated with the user device may be generated and associated using information received from the one or more neighboring user devices. In some embodiments, the use device configuration module 622 may determine the data should be stored in an existing state and may retrieve the state and update one or more parameters and store the updated state in the remote directory.

Figure 5:
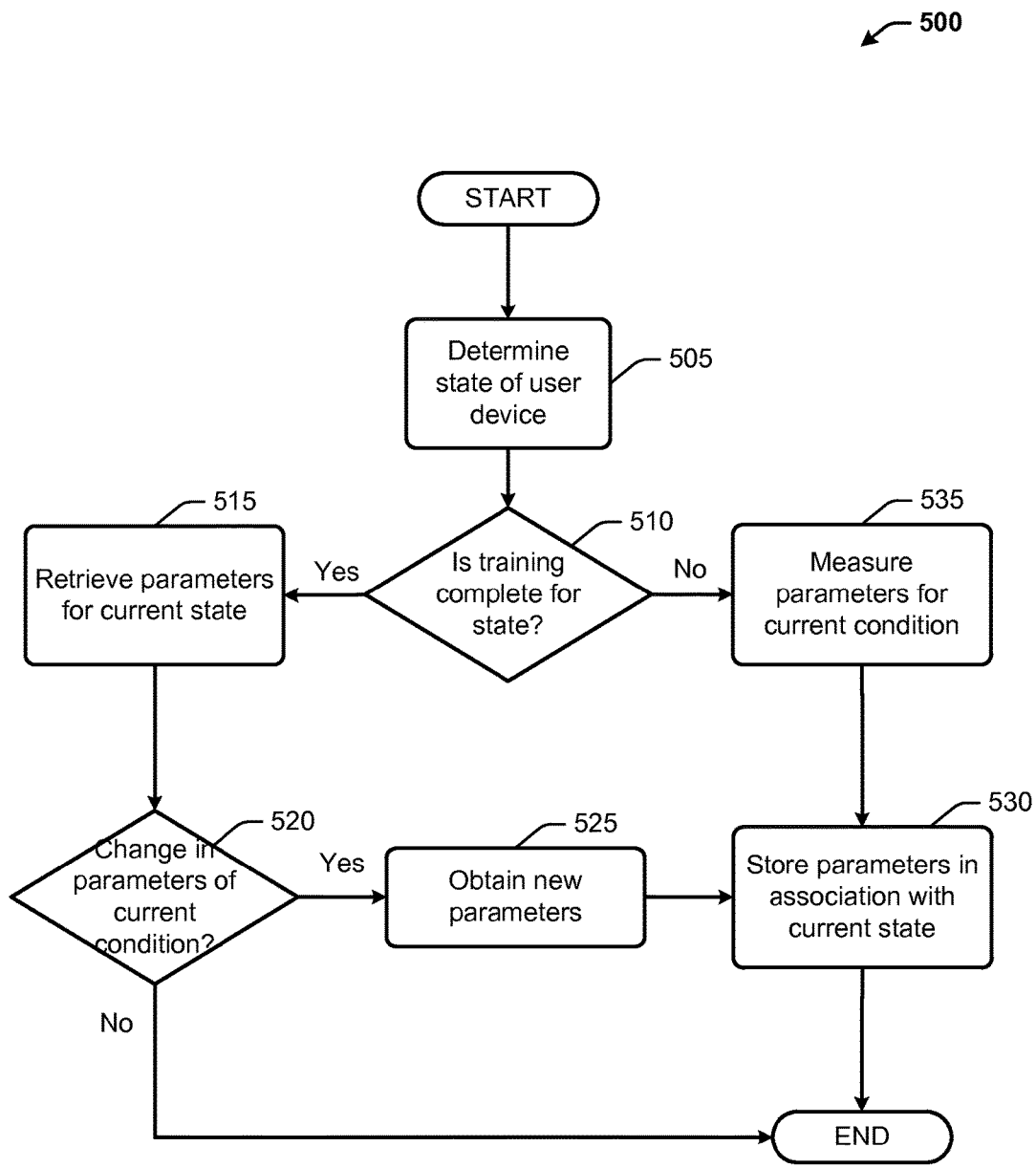
FIG. 5 is a process flow diagram of an illustrative method for determining a state of a user device in accordance with one or more example embodiments of the disclosure.

FIG. 5 is a process flow diagram of an illustrative method 500 for determining a state of a user device 104 in accordance with one or more example embodiments of the disclosure. In some embodiments, user device(s) 104 may periodically determine its current state, such as through a state identification event (SIE). A state identification event may be one or more actions performed to identify a current state. Actions may include collecting data, analyzing the collected data, retrieving state data, comparing the analyzed collected data to the retrieved state data, and/or updating device RF configurations or state data. In some embodiments, the user device(s) 104 may perform SIEs at predetermined fixed intervals in the background of the user device 104 during the normal operation of the device. In some embodiments, one or more SIE may be triggered by specific events or may be manually triggered by a user 102. In some embodiments, the one or more SIE may trigger training and non-training scenarios, as explained in detail below.

At block 505, a user device 104 may determine the state based at least in part on a SIE using data associated with the user device 104. In some embodiments, computer-executable instructions, code, or the like of a data collection module(s) 618 (which will be described in more detail later in this disclosure in reference to FIG. 6) may be executed by one or more processors to obtain data from different sources. For example, data may be collected by the data collection module 618 from one or more user applications, such as a calendar application, map application, reminders application or the like, where the data may have originated from a user 102 via user input. Additionally, the data collection module(s) 618 may obtain available network data from one or more antennas to identify available RF signals available, radio access network (RAN) availability, and/or WiFi availability. A SIE may initiate data collection by the data collection module 618. A current or temporary state associated with a user device 104 may be generated. The current state may include different parameters, such as RF configuration parameters, which may include, but are not limited to, network identifier parameter (e.g., the value of the network identifier parameter may be SSID), authentication credential parameter (e.g., the value of the authentication credential parameter may be a network key), or the like. In some embodiments, a value may be identified, such as a current network identifier of the user device 104. The value may be used to identify at least one previously stored state from a directory that may contain multiple states. The user device configuration module 622 may determine that at least one previously stored state corresponds to the identified value and may retrieve the identified previously stored state.

At block 510, computer-executable instructions, code, or the like of a user device configuration module(s) 622 (which will be described in more detail later in this disclosure in reference to FIG. 6) may be executed by one or more processors to determine whether training is complete (e.g., state does not have any null values for any parameters) for the identified state retrieved from the directory. In some embodiments, training may include identifying one or more parameters associated with the state and populating each parameter with a value based at least in part on data associated with the user device 104. For example, a state may be associated with a user device 104 in a particular location at a particular time of day, such as at a coffee shop between 9:00 AM and 11:00 AM. The state may include RF configuration settings for different available RF signals. The user device configuration module 622 may determine whether training is complete for a state based at least in part on different factors. For example, a training may be determined to be complete if all the parameters associated with a state contain a non-zero or non-null value. In another example, a training may be determined to be complete if a pre-determined interval of time or time threshold has been passed or exceeded (e.g., parameters may be deemed to expired or may be removed after a pre-determined interval of time has been exceeded). In some embodiments, the training may be determined to be complete based on any of the above and/or in combination with additional factors.

If at block 510, the user device configuration module 622 determines the training associated with the identified state retrieved from the directory is complete, then at block 515, the user device configuration module 622 may retrieve parameters associated with the identified state. In some embodiments, the parameters may be retrieved from a locally stored data structure, such as a table, stored in data storage. In some embodiments, the parameters may be retrieved from a remote directory, which may be stored on a remote server 106 or remote datastore. At block 520, the user device configuration module 622 may determine whether there has been a change in the parameters by comparing the stored parameters of the identified state with the parameters of the current state of the user device 104. If at block 520, the user device configuration module 622 determines no parameters have changed, then no updates are needed and the method ends. If at block 520, the user device configuration module 622 determines a parameter associated with the identified state has changed, then at block 525, the user device configuration module 622 may obtain data (e.g., via the data collection module 618) to obtain new values for the parameters associated with the identified state. In some embodiments, the values of the parameters of the retrieved identified state may be updated using the values of the current state of the user device 104. At block 530, the user device configuration module 622 may store the obtained values in association with a current or temporary state. For example, the user device configuration module 622 may associate parameters using the obtained values and store the updated parameters in association with the current state, which may be used to update the identified state and stored in the remote directory stored in a datastore (which will be described in more detail later in this disclosure in reference to FIG. 6).

If at block 510, the user device configuration module 622 determines training associated with a state is not complete, then at block 535, the user device configuration module 622 may obtain values for the current state. For example, the user device configuration module 622 may obtain data (e.g., from the data collection module 618) or other information associated with the current state from the user device 104, a machine learning engine 620 (e.g., which may analyze data obtained from the data collection module 620), and/or other devices (e.g., crowd sourcing optimization techniques described herein). At block 530, the user device configuration module 622 may store the obtained values in association with a current state. For example, the user device configuration module 622 may associate parameters using the obtained values and store the updated parameters in association with the current state, such as in a remote directory stored in a datastore (which will be described in more detail later in this disclosure in reference to FIG. 6).

In some embodiments, previously stored states may be scanned at periodic time intervals to identify when each of the stored states was last updated. If the time period since the last update of the state exceeds a time threshold (e.g., 3 months), then the state may be deleted and removed from any directory where the state data may be stored. In some embodiments, if the time period since the last update of the state exceeds the time threshold, the user device configuration module 622 may instruct or otherwise initiate the data collection module 618 to obtain new values for the state data parameters.

Illustrative Device Architecture

Figure 6:
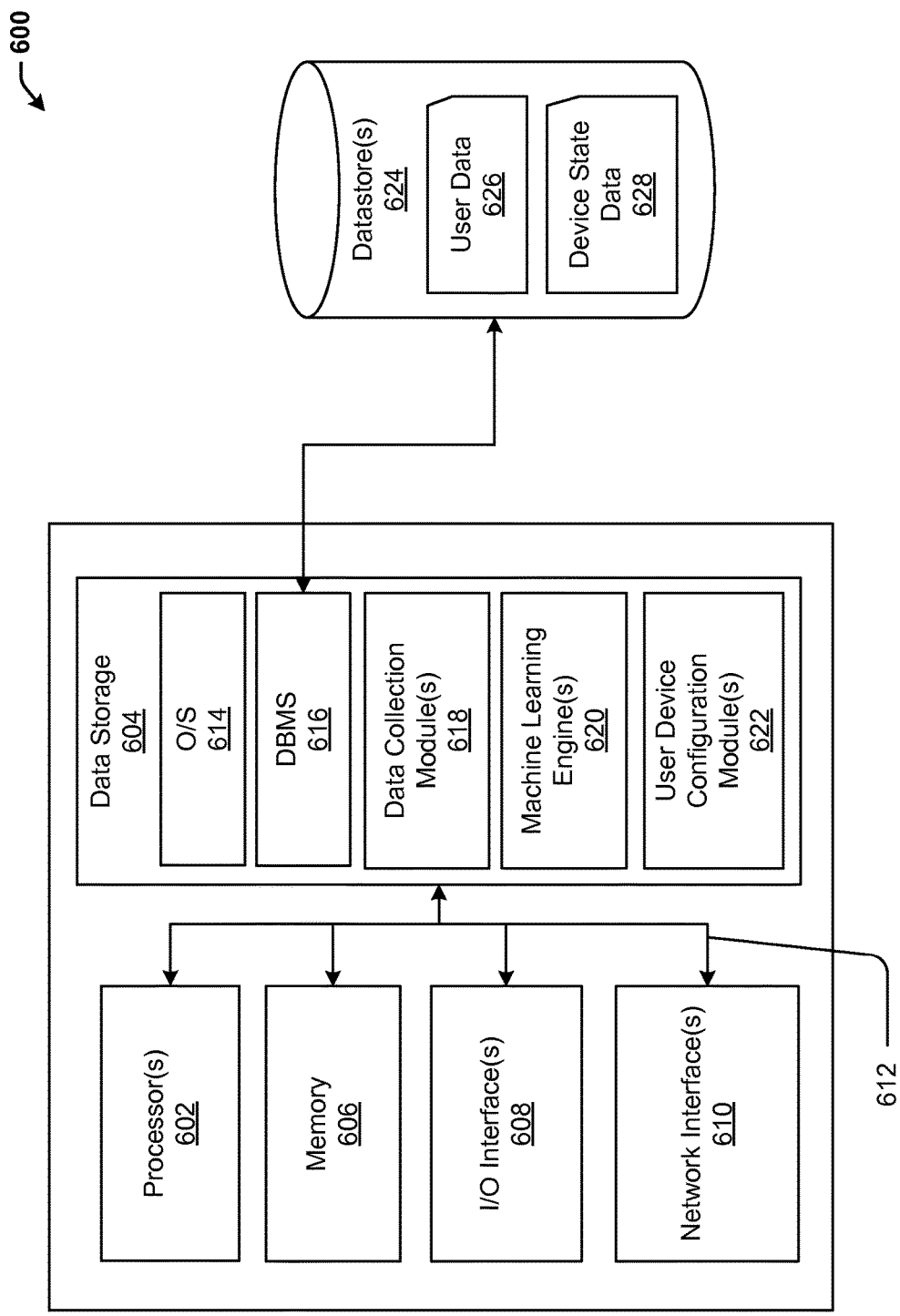
FIG. 6 is a schematic block diagram of an illustrative user device in accordance with one or more example embodiments of the disclosure.

FIG. 6 is a schematic block diagram of an illustrative user device 600 that may be used to perform any of the data processing and user device configuration described herein in accordance with one or more example embodiments of the disclosure. In an illustrative configuration, the user device 600 may include one or more processors (processor(s)) 602, one or more memory devices 606 (generically referred to herein as memory 606), one or more input/output ("I/O") interface(s) 608, one or more network interfaces 610, and data storage 604. The user device 600 may further include one or more buses 612 that functionally couple various components of the user device 600. In certain example embodiments, the user device 600 may be a mobile device that may include one or more antennas (not shown) including, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 612 may include at least one of a system bus, a memory bus, an address bus, or a message bus, and may permit exchange of information (e.g., data (including computer-executable code), signaling, etc.) between various components of the user device 600. The bus(es) 612 may include, without limitation, a memory bus or a memory controller, a peripheral bus, an accelerated graphics port, and so forth. The bus(es) 612 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 606 of the user device 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 606 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 606 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 604 may include removable storage and/or non-removable storage including, but not limited to, magnetic storage, optical disk storage, solid-state storage, and/or tape storage. The data storage 604 may provide non-volatile storage of computer-executable instructions and other data. The memory 606 and the data storage 604, removable and/or non-removable, are examples of computer-readable storage media (CRSM) as that term is used herein.

The data storage 604 may store computer-executable code, instructions, or the like that may be loadable into the memory 606 and executable by the processor(s) 602 to cause the processor(s) 602 to perform or initiate various operations. The data storage 604 may additionally store data that may be copied to memory 606 for use by the processor(s) 602 during the execution of the computer-executable instructions. Moreover, output data generated as a result of execution of the computer-executable instructions by the processor(s) 602 may be stored initially in memory 606, and may ultimately be copied to data storage 604 for non-volatile storage.

More specifically, the data storage 604 may store one or more operating systems (O/S) 614; one or more database management systems (DBMS) 616; and one or more program modules, applications, or the like such as, for example, one or more data collection modules 618, one or more machine learning engine(s) 620, and/or more user device configuration module(s) 622. The data storage 604 may further store any of variety of other types of modules. Further, any program modules stored in the data storage 604 may include one or more sub-modules. Further, any data stored in the data storage 604 may be loaded into the memory 606 for use by the processor(s) 602 in executing computer-executable code. In addition, any data potentially stored in one or more datastores 624 (e.g., user data 626, device state data 628) may be accessed via the DBMS 616 and loaded in the memory 606 for use by the processor(s) 602 in executing computer-executable code.

The processor(s) 602 may be configured to access the memory 606 and execute computer-executable instructions loaded therein. For example, the processor(s) 602 may be configured to execute computer-executable instructions of the various program modules of the user device 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program modules depicted in FIG. 6, the data collection module(s) 618 may include computer-executable instructions, code, or the like that, responsive to execution by one or more of the processor(s) 602, obtain data from many or more different sources either data storage of the device 600 or datastore 624. As previously described, the data collected may include, for example, application data, user preferences, previously stored RF configurations, user data, or the like.

The machine learning engine(s) 620 may include computer-executable instructions, code, or the like that, responsive to execution by one or more of the processor(s) 602, may receive the data collected by the data collection module(s) 618 and apply one or more machine learning algorithms to identify, for example, patterns of user behavior and/or parameters associated with RF configurations.

The user device configuration module(s) 622 may include computer-executable instructions, code, or the like that, responsive to execution by one or more of the processor(s) 602, may identify one or more possible RF configurations for a device 600, apply one or more preferences associated with a user 102 of the device 500, select and apply an RF configuration to the device 600, and/or save or modify RF configurations to a remote directory (e.g., stored on the device 600 in data storage 604 or in a datastore 624).

Referring now to other illustrative components depicted as being stored in the data storage 604, the O/S 614 may be loaded from the data storage 604 into the memory 606 and may provide an interface between other application software executing on the device 600 and hardware resources of the device 600. More specifically, the O/S 614 may include a set of computer-executable instructions for managing hardware resources of the device 600 and for providing common services to other application programs (e.g., managing memory allocation among various application programs). The O/S 614 may include any operating system now known or which may be developed in the future including, but not limited to, any server operating system, any mainframe operating system, or any other proprietary or non-proprietary operating system.

The DBMS 616 may be loaded into the memory 606 and may support functionality for accessing, retrieving, storing, and/or manipulating data stored in the memory 606, data stored in the data storage 604, and/or data stored in the one or more datastores 624. The DBMS 616 may use any of a variety of database models (e.g., relational model, object model, etc.) and may support any of a variety of query languages. The DBMS 616 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the device 600 is a mobile device, the DBMS 616 may be any suitable light-weight DBMS optimized for performance on a mobile device. Referring to the example types of data depicted as being stored in the datastore(s) 624, the user data 626 may include kind of data associated with a specific user device 600 and user behavioral data collected by the user device 600. The device state data 628 may include any data (e.g., device configuration data) generated as a result of any of the processing described herein (e.g., configuration data generated by the machine learning engine 620 or the user device configuration module 622, etc.). It should be appreciated that "data," as that term is used herein, includes computer-executable instructions, code, or the like.

Referring now to other illustrative components of the device 600, the one or more input/output (I/O) interfaces 608 may facilitate the receipt of input information by the device 600 from one or more I/O devices as well as the output of information from the device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 600 or may be separate. The I/O devices may further include, for example, any number of peripheral devices such as data storage devices, printing devices, and so forth.

The I/O interface(s) 608 may also include an interface for an external peripheral device connection such as universal serial bus (USB), FireWire, Thunderbolt, Ethernet port or other connection protocol that may connect to one or more networks. The I/O interface(s) 608 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 600 may further include one or more network interfaces 610 via which the device 600 may communicate with any of a variety of other systems, platforms, networks, devices, and so forth. Such communication may occur via one or more networks including, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The device 600 may be provided with antenna(s) (not shown), which may include any suitable type of antenna depending, for example, on the communications protocols used to transmit or receive signals via the antenna(s). Non-limiting examples of suitable antennas may include directional antennas, non-directional antennas, dipole antennas, folded dipole antennas, patch antennas, multiple-input multiple-output (MIMO) antennas, or the like. The antenna(s) may be communicatively coupled to one or more transceivers or radio components (not shown) to which or from which signals may be transmitted or received.

It should be appreciated that the program modules, applications, computer-executable instructions, code, or the like depicted in FIG. 6 as being stored in the data storage 604 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 600, and/or hosted on other computing device(s) accessible via one or more networks, may be provided to support functionality provided by the program modules, applications, or computer-executable code depicted in FIG. 6 and/or additional or alternate functionality. Further, functionality may be modularized differently such that processing described as being supported collectively by the collection of program modules depicted in FIG. 6 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 6 may be implemented, at least partially, in hardware and/or firmware across any number of devices.

It should further be appreciated that the device 600 may include alternate and/or additional hardware, software, or firmware components beyond those described or depicted without departing from the scope of the disclosure. More particularly, it should be appreciated that software, firmware, or hardware components depicted as forming part of the device 600 are merely illustrative and that some components may not be present or additional components may be provided in various embodiments. While various illustrative program modules have been depicted and described as software modules stored in data storage 604, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods 300-500 may have been described above as being performed by one or more components of the device 600, or more specifically, by one or more one or more program modules executing on such a device 600. It should be appreciated, however, that any of the operations of methods 300-500 may be performed, at least in part, in a distributed manner by one or more other devices or systems, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of any of the methods 300-500 may be described in the context of the illustrative user device 600, it should be appreciated that such operations may be implemented in connection with numerous other system configurations.

The operations described and depicted in the illustrative methods of FIGS. 3-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 3-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The invention claimed is:

1. A method comprising:
 receiving, by a first mobile device from a second mobile device, first data comprising a first network identifier value of a first wireless network and a first value indicative of a signal strength of the first wireless network;

receiving, by the first mobile device from a third mobile device different from the second mobile device, second data comprising a second network identifier value of a second wireless network and a second value indicative of a signal strength of the second wireless network;

determining, by the first mobile device, that the first value is greater than the second value; and updating, by the first mobile device, a network identifier parameter of a radio frequency (RF) configuration of the first mobile device using the first network identifier value;

wherein the second mobile device is configured to move independent of the first mobile device, the third mobile device is configured to move independent of the first mobile device, and the first mobile device is configured to move independent of the second mobile device.

2. The method of claim 1, further comprising:

retrieving, by the first mobile device, a user-specified preference for selecting a wireless network, wherein the user-specified preference indicates a preference to connect to a secure wireless network;

determining, by the first mobile device, that the first wireless network is unsecure and that the second wireless network is secure;

obtaining, by the first mobile device, an authentication credential value of the second wireless network;

updating, by the first mobile device, a network key parameter of the RF configuration using the authentication credential value; and establishing, by the first mobile device, a connection with the second wireless network.

3. The method of claim 1, wherein the first data and the second data are received from a base station and the method further comprises:

receiving, by the first mobile device from the base station, a first traffic data value associated with the first wireless network, the first traffic data value indicative of a current number of mobile devices connected to the first wireless network; and receiving, by the first mobile device from the base station, a second traffic data value associated with the second wireless network, the second traffic data value indicative of a current number of mobile devices connected to the second wireless network.

4. The method of claim 3, further comprising:

retrieving, by the first mobile device, a user-specified preference for selecting a wireless network, wherein the user-specified preference is indicative of a preference to connect to the wireless network with a current number of mobile devices connected that is below a threshold;

determining, by the first mobile device, the first traffic data value is higher than the threshold and the second traffic data value is lower than the threshold;

updating, by the first mobile device, the network identifier parameter of the RF configuration using the second network identifier value; and establishing, by the first mobile device, a connection with the second wireless network.

5. The method of claim 3, further comprising:

retrieving, by the first mobile device, a user-specified preference for selecting a wireless network, wherein the user-specified preference indicates a preference to connect to the wireless network with a lowest current number of mobile devices connected;

determining, by the first mobile device, the first traffic data value is higher than the second traffic data value;

updating, by the first mobile device, the network identifier parameter of the RF configuration using the second network identifier value; and establishing, by the first mobile device, a connection with the second wireless network.

6. The method of claim 1, further comprising:

measuring, by the first mobile device, a new value indicative of the signal strength of the first wireless network; and transmitting, by the first mobile device, the first network identifier value and the new value to a fourth mobile device.

7. The method of claim 1, further comprising:

determining, by the first mobile device, that a user application of the first mobile device is requesting global positioning system (GPS) data;

determining, by the first mobile device, a first distance between the first mobile device and the second mobile device and a second distance between the first mobile device and the third mobile device;

determining, by the first mobile device, that the first distance is less than the second distance;

receiving, by the first mobile device, GPS ephemeris data and almanac information from the second mobile device, the GPS ephemeris data indicative of a current location of the second mobile device; and providing, by the first mobile device, the GPS ephemeris data and almanac information to the user application.

8. The method of claim 1, further comprising:

determining, by the first mobile device, a first time of receipt of the first data from the second mobile device;

determining, by the first mobile device, the first time of receipt is after a predetermined time;

requesting, by the first mobile device, updated first data from the second mobile device;

receiving, by the first mobile device, the updated first data from the second mobile device, wherein the updated first data comprises an updated first value indicative of the signal strength of the first wireless network;

determining, by the first mobile device, that the updated first value is less than the second value; and updating, by the first mobile device, the network identifier parameter of the radio frequency (RF) configuration of the first mobile device using the second network identifier value.

9. The method of claim 1, further comprising:

obtaining, by the first mobile device, user application data from a user application of the first mobile device;

identifying, by the first mobile device, a value corresponding to the network identifier parameter of the RF configuration from the user application data;

determining, by the first mobile device, that the value is the same as the second network identifier value of the second wireless network;

obtaining, by the first mobile device, a network key value of the second wireless network; and updating, by the first mobile device, a network key parameter of the RF configuration using the network key value of the second wireless network value.

10. The method of claim 1, further comprising:

determining, by the first mobile device, a first distance between the first mobile device and the second mobile device, and a second distance between the first mobile device and the third mobile device;

determining, by the first mobile device, that the first distance is greater than the second distance; and updating, by the first mobile device, the network identifier parameter of the RF configuration of the first mobile device using the second network identifier value.

11. A system comprising a first mobile device, wherein the first mobile device further comprises:
at least one memory storing computer-executable instructions; and
at least one processor configured to access the at least one memory and execute the computer-executable instructions to perform operations comprising:
receiving, by the first mobile device from a second mobile device, first data comprising a first network identifier value of a first wireless network and a first value indicative of a signal strength of the first wireless network;
receiving, by the first mobile device from a third mobile device different from the second mobile device, second data comprising a second network identifier value of a second wireless network and a second value indicative of a signal strength of the second wireless network;
determining, by the first mobile device, that the first value is greater than the second value; and
updating, by the first mobile device, a network identifier parameter of a radio frequency (RF) configuration of the first mobile device using the first network identifier value;
wherein the second mobile device is configured to move independent of the first mobile device, the third mobile device is configured to move independent of the first mobile device, and the first mobile device is configured to move independent of the second mobile device.

12. The system of claim 1, wherein the operations further comprise:
retrieving, by the first mobile device, a user-specified preference for selecting a wireless network, wherein the user-specified preference indicates a preference to connect to a secure wireless network;
determining, by the first mobile device, that the first wireless network is unsecure and that the second wireless network is secure;
obtaining, by the first mobile device, an authentication credential value of the second wireless network;
updating, by the first mobile device, a network key parameter of the RF configuration using the authentication credential value; and
establishing, by the first mobile device, a connection with the second wireless network.

13. The system of claim 1, wherein the operations further comprise:
receiving, by the first mobile device from a base station, a first traffic data value associated with the first wireless network, the first traffic data value indicative of a current number of mobile devices connected to the first wireless network; and
receiving, by the first mobile device from the base station, a second traffic data value associated with the second wireless network, the second traffic data value indicative of a current number of mobile devices connected to the second wireless network.

14. The system of claim 13, wherein the operations further comprise:
retrieving, by the first mobile device, a user-specified preference for selecting a wireless network, wherein the user-specified preference is indicative of a preference to connect to the wireless network with a current number of mobile devices connected that is below a threshold;
determining, by the first mobile device, the first traffic data value is higher than the threshold and the second traffic data value is lower than the threshold;
updating, by the first mobile device, the network identifier parameter of the RF configuration using the second network identifier value; and
establishing, by the first mobile device, a connection with the second wireless network.

15. The system of claim 13, wherein the operations further comprise:
retrieving, by the first mobile device, a user-specified preference for selecting a wireless network, wherein the user-specified preference indicates a preference to connect to the wireless network with a lowest current number of mobile devices connected;
determining, by the first mobile device, the first traffic data value is higher than the second traffic data value;
updating, by the first mobile device, the network identifier parameter of the RF configuration using the second network identifier value; and
establishing, by the first mobile device, a connection with the second wireless network.

16. The system of claim 11, wherein the operations further comprise:
measuring, by the first mobile device, a new value indicative of the signal strength of the first wireless network; and
transmitting, by the first mobile device, the first network identifier value and the new value to a fourth mobile device.

17. The system of claim 11, wherein the operations further comprise:
determining, by the first mobile device, that a user application of the first mobile device is requesting global positioning system (GPS) data;
determining, by the first mobile device, a first distance between the first mobile device and the second mobile device and a second distance between the first mobile device and the third mobile device;
determining, by the first mobile device, that the first distance is less than the second distance;
receiving, by the first mobile device, GPS ephemeris data and almanac information from the second mobile device, the GPS ephemeris data indicative of a current location of the second mobile device; and
providing, by the first mobile device, the GPS ephemeris data and almanac information to the user application.

18. The system of claim 11, wherein the operations further comprise:
determining, by the first mobile device, a first time of receipt of the first data from the second mobile device;
determining, by the first mobile device, the first time of receipt is after a predetermined time;
requesting, by the first mobile device, updated first data from the second mobile device;
receiving, by the first mobile device, the updated first data from the second mobile device, wherein the updated first data comprises an updated first value indicative of the signal strength of the first wireless network;
determining, by the first mobile device, that the updated first value is less than the second value; and updating, by the first mobile device, the network identifier parameter of the radio frequency (RF) configuration of the first mobile device using the second network identifier value.

19. The system of claim 11, wherein the operations further comprise:
obtaining, by the first mobile device, user application data from a user application of the first mobile device;
identifying, by the first mobile device, a value corresponding to the network identifier parameter of the RF configuration from the user application data;
determining, by the first mobile device, that the value is the same as the second network identifier value of the second wireless network;
obtaining, by the first mobile device, a network key value of the second wireless network; and
updating, by the first mobile device, a network key parameter of the RF configuration using the network key value of the second wireless network value.

20. A method comprising:
receiving, by a first mobile device from a second mobile device, first data comprising a first network identifier value of a first wireless network and a first value indicative of a signal strength of the first wireless network;
receiving, by the first mobile device from a third mobile device different from the second mobile device, second data comprising a second network identifier value of a second wireless network and a second value indicative of a signal strength of the second wireless network;
determining, by the first mobile device, that the first value is greater than the second value;
updating, by the first mobile device, a network identifier parameter of a radio frequency (RF) configuration of the first mobile device using the first network identifier value;
determining, by the first mobile device, a first time of receipt of the first data from the second mobile device;
determining, by the first mobile device, the first time of receipt is after a predetermined time;
requesting, by the first mobile device, updated first data from the second mobile device;
receiving, by the first mobile device, the updated first data from the second mobile device, wherein the updated first data comprises an updated first value indicative of the signal strength of the first wireless network;
determining, by the first mobile device, that the updated first value is less than the second value; and
updating, by the first mobile device, the network identifier parameter of the radio frequency (RF) configuration of the first mobile device using the second network identifier value.

* * * * *